(12) United States Patent
Morris, Jr.

(10) Patent No.: US 7,966,112 B1
(45) Date of Patent: Jun. 21, 2011

(54) MILEAGE TRACKING DEVICE

(75) Inventor: Robert E. Morris, Jr., Camden-Wyoming, DE (US)

(73) Assignee: Robert E. Morris, Jr, Camden-Wyoming, DE (US)

( * ) Notice: Subject to any disclaimer, the term of this patent is extended or adjusted under 35 U.S.C. 154(b) by 956 days.

(21) Appl. No.: 11/799,821

(22) Filed: May 3, 2007

(51) Int. Cl.
*G09G 5/00* (2006.01)
*G08G 1/123* (2006.01)
*G06F 19/00* (2006.01)

(52) U.S. Cl. ............... 701/35; 701/29; 701/33; 340/439

(58) Field of Classification Search ............... 701/35, 701/29, 33; 340/439, 438, 459
See application file for complete search history.

(56) References Cited

U.S. PATENT DOCUMENTS

| | | | |
|---|---|---|---|
| 6,459,969 B1 * | 10/2002 | Bates et al. | ............ 701/29 |
| 6,542,120 B1 | 4/2003 | Gilbertson | |
| 6,718,263 B1 | 4/2004 | Glass et al. | |
| 6,741,933 B1 | 5/2004 | Glass | |
| 6,826,473 B1 | 11/2004 | Burch et al. | |
| 6,975,929 B2 | 12/2005 | Maruyama | |
| 6,976,180 B2 | 12/2005 | Cupps et al. | |
| 7,187,364 B2 * | 3/2007 | Duarte et al. | ............ 345/168 |
| 7,209,813 B2 * | 4/2007 | Namaky | ............ 701/29 |
| 7,522,069 B2 * | 4/2009 | Tunnell et al. | ............ 340/995.19 |
| 2001/0020204 A1 | 9/2001 | Runyon et al. | |
| 2006/0012563 A1 * | 1/2006 | Fyke et al. | ............ 345/156 |
| 2007/0025367 A1 * | 2/2007 | Wijnands | ............ 370/401 |
| 2009/0181730 A1 * | 7/2009 | Higginson | ............ 455/575.1 |

* cited by examiner

*Primary Examiner* — Tan Q Nguyen

(57) ABSTRACT

Mileage tracking devices track a vehicle's mileage. A top is hingedly attached to a bottom in a "clamshell" design. The front of the top has an LCD touchscreen, and the front of the bottom has a keypad. The rear of the top has a solar panel, and the rear of the bottom has a battery compartment enclosing a rechargeable battery. One side of the bottom has a USB port, and the opposing side of the bottom has a power port that receives one end of a car charger. Voice recognition software and data are stored in memory accessed by a microprocessor. The mileage tracking device provides calculator, calendar, address book, mileage log, and car maintenance functions. The LCD touchscreen displays the current date and time and the level of charge of the rechargeable battery.

18 Claims, 4 Drawing Sheets

MILEAGE TRACKING DEVICE

BACKGROUND OF THE INVENTION

1. Field of the Invention

The present invention relates to a mileage tracking device for use in connection with record-keeping for filing income taxes. The mileage tracking device has particular utility in connection with tracking a vehicle's mileage.

2. Description of the Prior Art

Mileage tracking devices are desirable for tracking a vehicle's mileage. Individuals driving vehicles for business purposes often need to track mileage for reimbursement or tax deduction purposes. The Internal Revenue Service requires detailed records regarding the date, purpose, and length of each journey to support tax deductibility, as do many employers. Prior art devices have been developed to meet this need, but they require access to the Global Positioning System (GPS) to function and are usually not hand-held devices.

The use of travel trackers is known in the prior art. For example, U.S. Pat. No. 6,741,933 to Glass discloses a travel tracker. However, the Glass '933 patent does not function without access to the global positioning system, and has further drawbacks of not being a hand-held device.

U.S. Pat. No. 6,718,263 to Glass et al. discloses a travel tracker network system that identifies, tracks, and reports tax-deductible vehicle travel routes. However, the Glass et al. '263 patent does not function without access to the global positioning system, and additionally is not a hand-held device.

Similarly, United States Patent Application Publication Number 2001/0020204 to Runyon et al. discloses a system for tracking vehicle and driver location and mileage and generating reports therefrom that tracks vehicle and driver location, mileage and time, and generates reports therefrom. However, the Runyon et al. 2001/0020204 patent application publication does not function without access to the global positioning system, and cannot be carried as a hand-held device.

In addition, U.S. Pat. No. 6,975,929 to Maruyama discloses a data recording apparatus, data recording method, program for data recording and information recording medium that manages the travel history of a moving object according to the objectives of the travel. However, the Maruyama '929 patent does not function without access to the global positioning system, and also is not a hand-held device.

Furthermore, U.S. Pat. No. 6,826,473 to Burch et al. discloses a PDA with integrated navigation functions and expense reporting that integrates navigation data with PDA expense reporting functions. However, the Burch et al. '473 patent does not function without access to the global positioning system, and further lacks a solar panel.

U.S. Pat. No. 6,976,180 to Cupps et al. discloses a personal electronics device that performs a significantly increased range of functions in a hand-held unit. However, the Cupps et al. '180 patent does not track a vehicle's mileage, and has the additional deficiency of lacking a solar panel.

Lastly, U.S. Pat. No. 6,542,120 to Gilbertson discloses a solar powered GPS device that receives GPS signals transmitted from GPS satellites in order to determine a time of day. However, the Gilbertson '120 patent does not function without access to the global positioning system, and also does not track a vehicle's mileage.

While the above-described devices fulfill their respective, particular objectives and requirements, the aforementioned patents do not describe a mileage tracking device that allows tracking a vehicle's mileage.

Therefore, a need exists for a new and improved mileage tracking device that can be used for tracking a vehicle's mileage. In this regard, the present invention substantially fulfills this need. In this respect, the mileage tracking device according to the present invention substantially departs from the conventional concepts and designs of the prior art, and in doing so provides an apparatus primarily developed for the purpose of tracking a vehicle's mileage.

SUMMARY OF THE INVENTION

In view of the foregoing disadvantages inherent in the known types of travel trackers now present in the prior art, the present invention provides an improved mileage tracking device, and overcomes the above-mentioned disadvantages and drawbacks of the prior art. As such, the general purpose of the present invention, which will be described subsequently in greater detail, is to provide a new and improved mileage tracking device which has all the advantages of the prior art mentioned heretofore and many novel features that result in a mileage tracking device which is not anticipated, rendered obvious, suggested, or even implied by the prior art, either alone or in any combination thereof.

To attain this, the present invention essentially comprises a top with one of its opposing ends hingedly attached to one of the opposing ends of a bottom. A display is attached to the top's front. A keypad is attached to the bottom's front. A microprocessor is connected to the keypad and the display. Memory is connected to the microprocessor. The memory and the microprocessor perform calculator, calendar, address book, mileage log, and car maintenance tracking functions.

There has thus been outlined, rather broadly, the more important features of the invention in order that the detailed description thereof that follows may be better understood and in order that the present contribution to the art may be better appreciated.

The invention may also include the display being an LCD touchscreen. There may be a data port attached to one of the opposing sides of the bottom. The data port may be an Ethernet port, a USB port, or a FireWire port. There may be a battery compartment attached to the bottom's rear. There may be a battery removably enclosed by the battery compartment. The battery may be rechargeable. There may be a solar panel attached to the top's rear. There may be a power port attached to one of the rear's opposing sides. The calculator function may comprise addition, subtraction, multiplication, and division. The calendar function may comprise entering and retrieving one or more appointments with date, time, and location data. The address book function may comprise entering and retrieving name, address, telephone number, and e-mail address data. The mileage log function may comprise entering and retrieving starting date and time, ending date and time, starting odometer reading, ending odometer reading, total miles traveled, and purpose/destination data. The car maintenance function may comprise entering and retrieving next oil change date, next tire rotation date, mileage interval between oil changes, and mileage interval between tire rotations data. There may be voice recognition software stored in the memory. The display may display the current date and time and the current charge of the battery. There may be a docking station that connects the microprocessor to a vehicle's battery and odometer. There may be a car charger with one of its opposing ends adapted to fit the power port and the other of its opposing ends adapted to fit a DC power outlet of a vehicle. There are, of course, additional features of the invention that will be described hereinafter and which will form the subject matter of the claims attached.

Numerous objects, features, and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved mileage tracking device that has all of the advantages of the prior art travel trackers and none of the disadvantages.

It is another object of the present invention to provide a new and improved mileage tracking device that may be easily and efficiently manufactured and marketed.

An even further object of the present invention is to provide a new and improved mileage tracking device that has a low cost of manufacture with regard to both materials and labor, and which accordingly is then susceptible of low prices of sale to the consuming public, thereby making such mileage tracking device economically available to the buying public.

Still another object of the present invention is to provide a new mileage tracking device that provides in the apparatuses and methods of the prior art some of the advantages thereof, while simultaneously overcoming some of the disadvantages normally associated therewith.

Even still another object of the present invention is to provide a mileage tracking device for tracking a vehicle's mileage. This allows the user to track mileage without GPS access.

Still yet another object of the present invention is to provide a mileage tracking device for tracking a vehicle's mileage. This makes it possible for the user to know when to rotate their vehicle's tires.

An additional object of the present invention is to provide a mileage tracking device for tracking a vehicle's mileage. This makes it possible for the user to know when to change their vehicle's oil.

A further object of the present invention is to provide a mileage tracking, device for tracking a vehicle's mileage. This makes it possible for the user to track their appointments.

Lastly, it is, an object of the present invention to provide a new and improved mileage tracking device for tracking a vehicle's mileage.

These together with other objects of the invention, along with the various features of novelty that characterize the invention, are pointed out with particularity in the claims annexed to and forming a part of this disclosure. For a better understanding of the invention, its operating advantages, and the specific objects attained by its uses, reference should be had to the accompanying drawings and descriptive matter in which there is illustrated current embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various figures.

DESCRIPTION OF THE CURRENT EMBODIMENT

Figure 1:
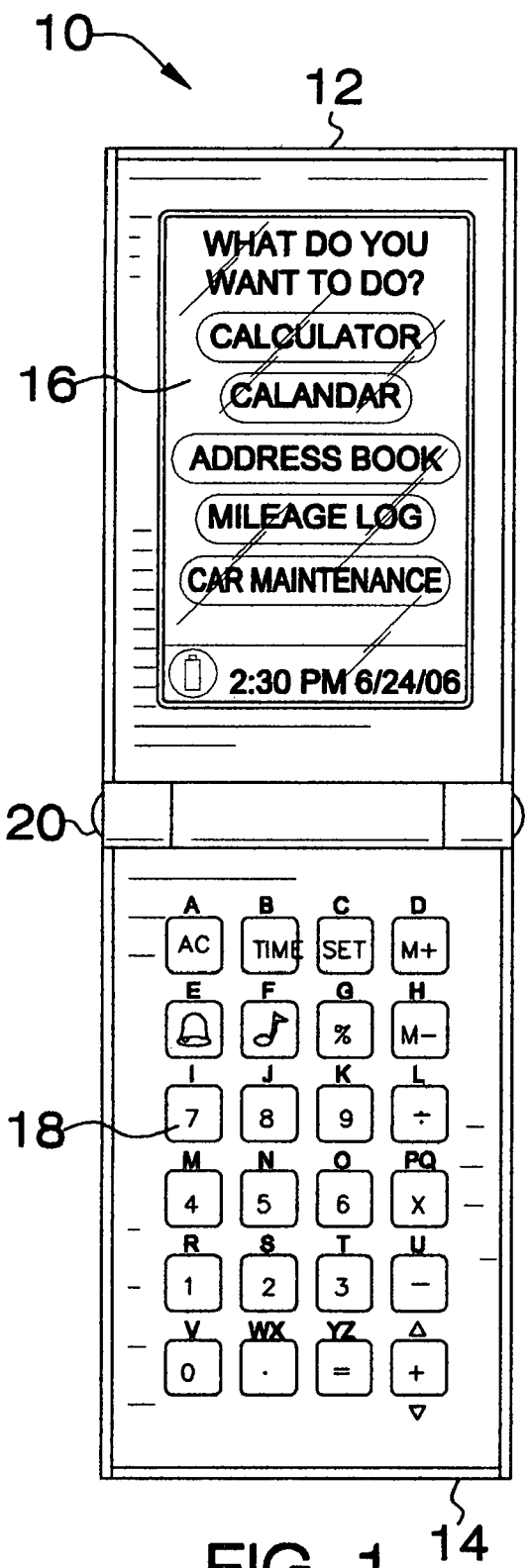
FIG. 1 is a top view of the current embodiment of the mileage tracking device constructed in accordance with the principles of the present invention.

Referring now to the drawings, and particularly to FIGS. 1-6, a current embodiment of the mileage tracking device of the present invention is shown and generally designated by the reference numeral 10.

In FIG. 1, a new and improved mileage tracking device 10 of the present invention for tracking a vehicle's mileage is illustrated and will be described. More particularly, the mileage tracking device 10 has a top 12 hingedly connected by hinge 20 to a bottom 14. Mileage tracking device 10 is depicted in its opened position. The front of top 12 has a display 16 attached to it. The front of bottom 14 has a keypad 18 attached to it. Keypad 18 enables the user to control mileage tracking device 10. As a default, display 16 displays the strength of rechargeable battery 32, the current date and time, and the functions "calculator," "calendar," "address book," "mileage log," and "car maintenance." In the current embodiment, display 16 is a touch sensitive LCD display. When "calculator" is pressed, standard calculator functions of addition, subtraction, multiplication, and division are enabled by keypad 18. When "calendar" is pressed, a calendar is displayed and the user can enter appointments using keypad 18 associated with particular dates and times. When a date and time for an appointment is reached, the mileage tracking device 10 provides the user with audible and/or visual notification of the appointment. When "address book" is pressed, the user can enter new contacts and retrieve existing contacts. Each contact has a variety of data associate it with it, including name, one or more addresses, one or more telephone numbers, and one or more e-mail addresses. When "mileage log" is pressed, the user can enter and retrieve information about trips, including starting date and time, ending date and time, starting odometer reading, ending odometer reading, total miles traveled, and purpose/destination. When "car maintenance" is pressed, the user can view when their next oil change and tire rotation is due. The user can enter the number of miles they wish to travel between oil changes and tire rotations with a different quantity for each category. When an odometer reading is entered into the mileage tracking device 10 that is equal to or greater than the mileage associated with the next tire rotation and/or next oil change, the mileage tracking device 10 provides audible and/or visual notification of the need for an oil change and/or tire rotation. In addition to keypad 18 and display 16, voice recognition software contained in memory 36 may also be used to control mileage tracking device 10.

Figure 2:
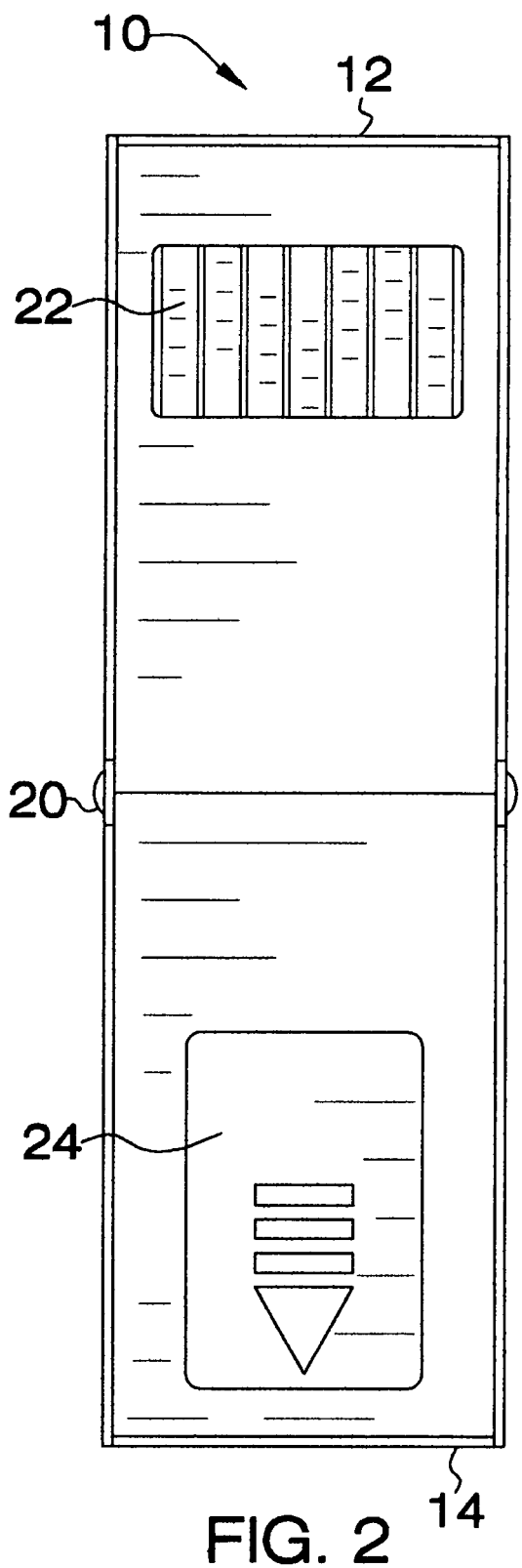
FIG. 2 is a bottom view of the mileage tracking device of the present invention.

Moving on to FIG. 2, a new and improved mileage tracking device 10 of the present invention for tracking a vehicle's mileage is illustrated and will be described. More particularly, the mileage tracking device 10 has a top 12 hingedly connected by hinge 20 to bottom 14. Mileage tracking device 10 is depicted in its opened position. The rear of top 12 has solar panel 22. Solar panel 22 charges rechargeable battery 32 when solar panel 22 is exposed to sunlight. The rear of bottom 14 has a battery compartment 24 that encloses rechargeable battery 32.

Figure 3:
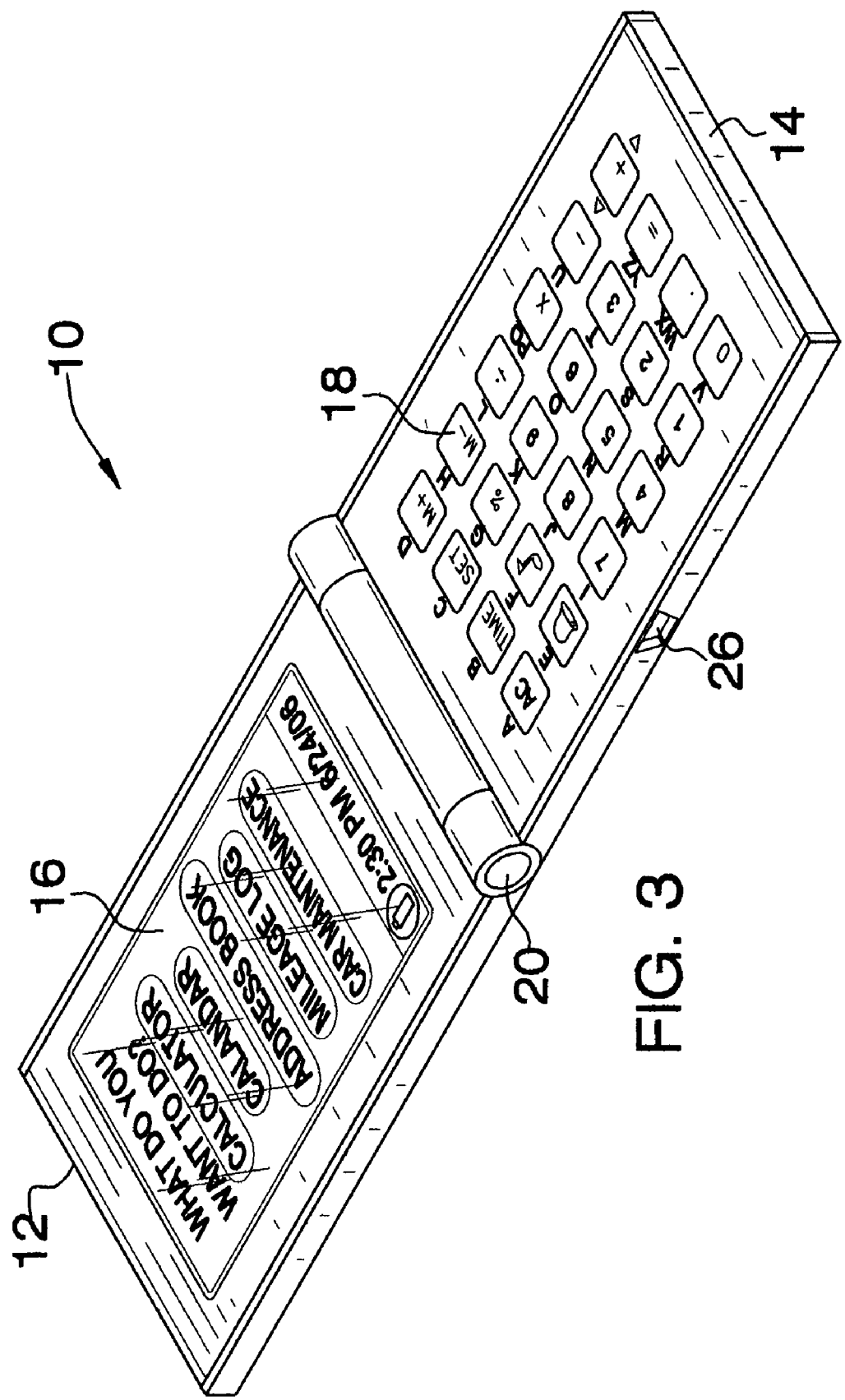
FIG. 3 is a top perspective view of the mileage tracking device of the present invention.

Continuing with FIG. 3, a new and improved mileage tracking device 10 of the present invention for tracking a vehicle's mileage is illustrated and will be described. More particularly, the mileage tracking device 10 has a top 12 hingedly connected by hinge 20 to bottom 14. Mileage tracking device 10 is depicted in its opened position. Display 16 is visible on the front of top 12, and keypad 18 is visible on the front of bottom 14. A data port 26 is connected to one of the opposing sides of bottom 14. In the current embodiment, data port 26 is a USB port.

Figure 4:
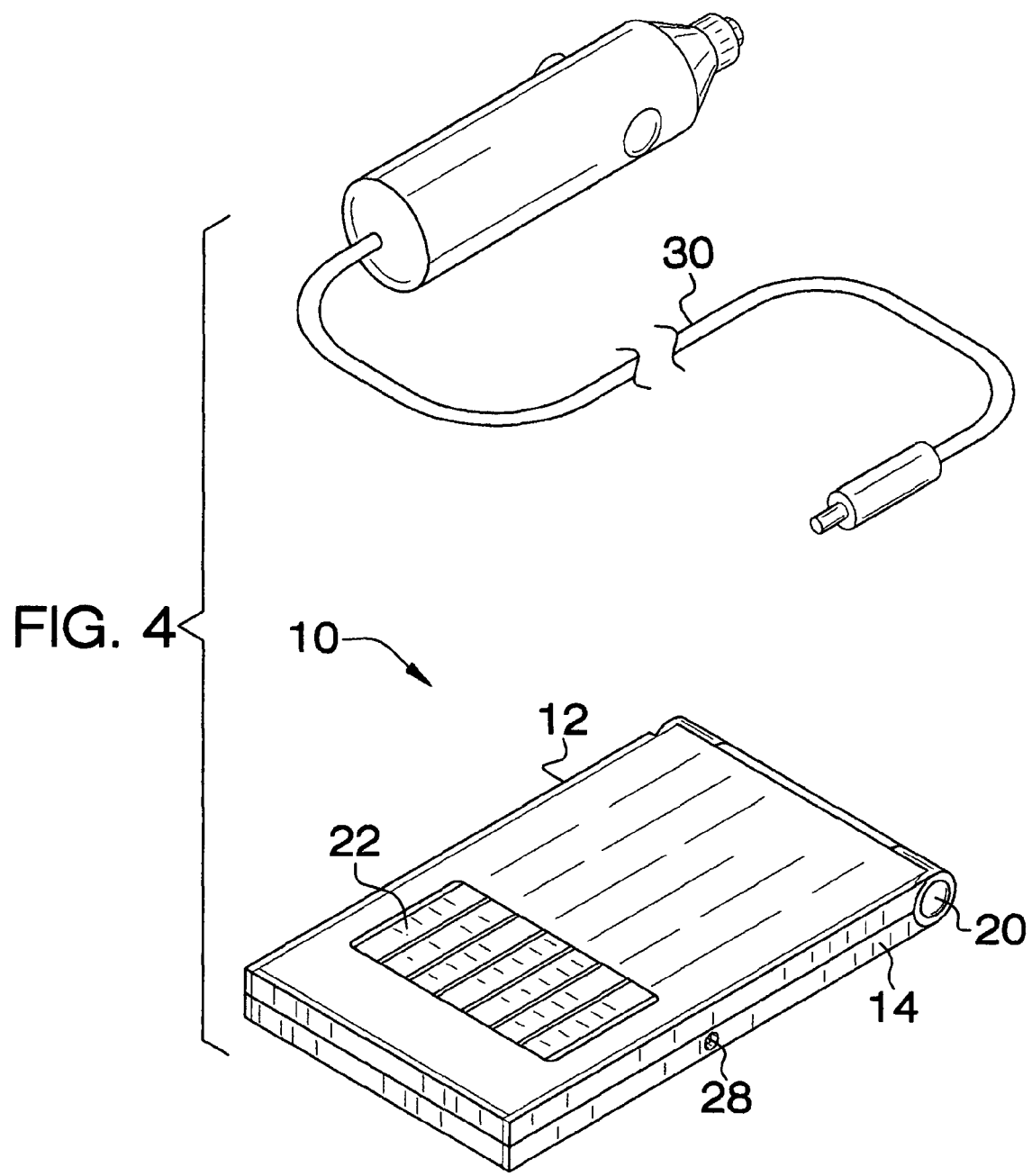
FIG. 4 is a bottom perspective view of the mileage tracking device of the present invention.

In FIG. 4, a new and improved mileage tracking device 10 of the present invention for tracking a vehicle's mileage is illustrated and will be described. More particularly, the mileage tracking device 10 has a top 12 hingedly attached to a bottom 14 by hinge 20. Mileage tracking device 10 is depicted in its closed position, showing its "clamshell" design. Solar panel 22 is visible on the rear of top 12, and a power port 28 is connected to one of the opposing sides of bottom 14. A car charger 30 has one end that plugs into power port 28, and its opposing end plugs into a DC power outlet of a vehicle. When car charger 30 connects mileage tracking device 10 to a live DC power outlet of a vehicle, rechargeable battery 32 recharges.

Figure 5:
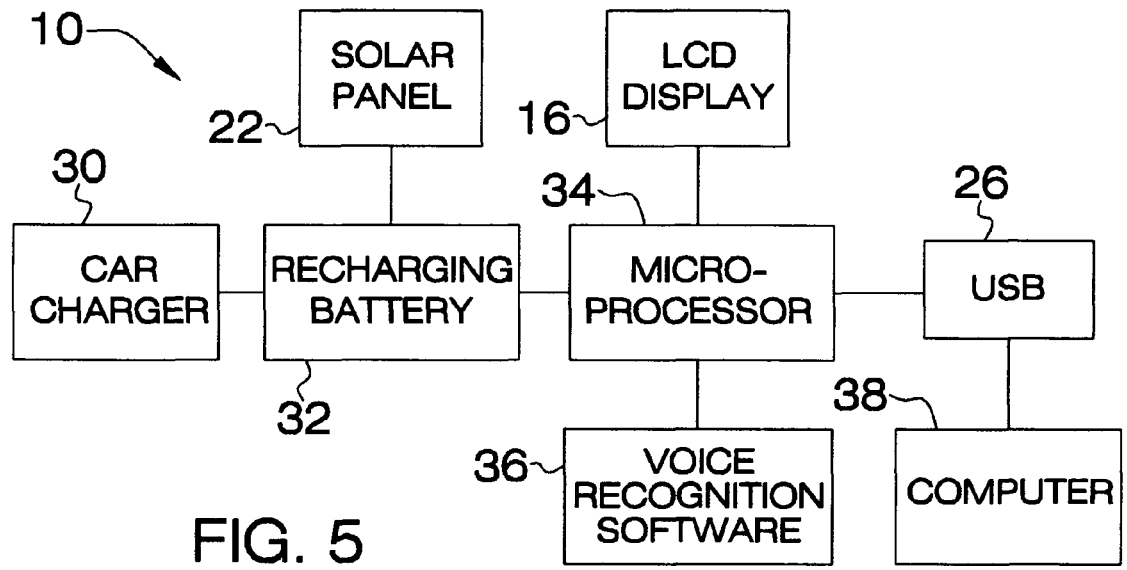
FIG. 5 is a schematic view of the mileage tracking device of the present invention.

Furthermore, in FIG. 5, a new and improved mileage tracking device 10 of the present invention for tracking a vehicle's mileage is illustrated and will be described. More particularly, the mileage tracking device 10 has solar panel 22 and car charger 30 that can both be used to recharge rechargeable battery 32. Rechargeable battery 32 powers microprocessor 34 and display 16. Memory 36 stores voice recognition software, data input by the user, and data generated by the microprocessor 34. Using data port 26, a computer 38 can be connected to mileage tracking device 10 to download information from mileage tracking device 10 and to upload information from computer 38 into memory 36. When memory 36 is 75% or more full, mileage tracking device 10 provides an audible and/or visual notification that a computer 38 should be connected to data port 26 so that memory 36 can transfer at least a portion of its contents to computer 38. Note that computer 38 is for illustrative purposes only and is not part of the current invention.

Figure 6:
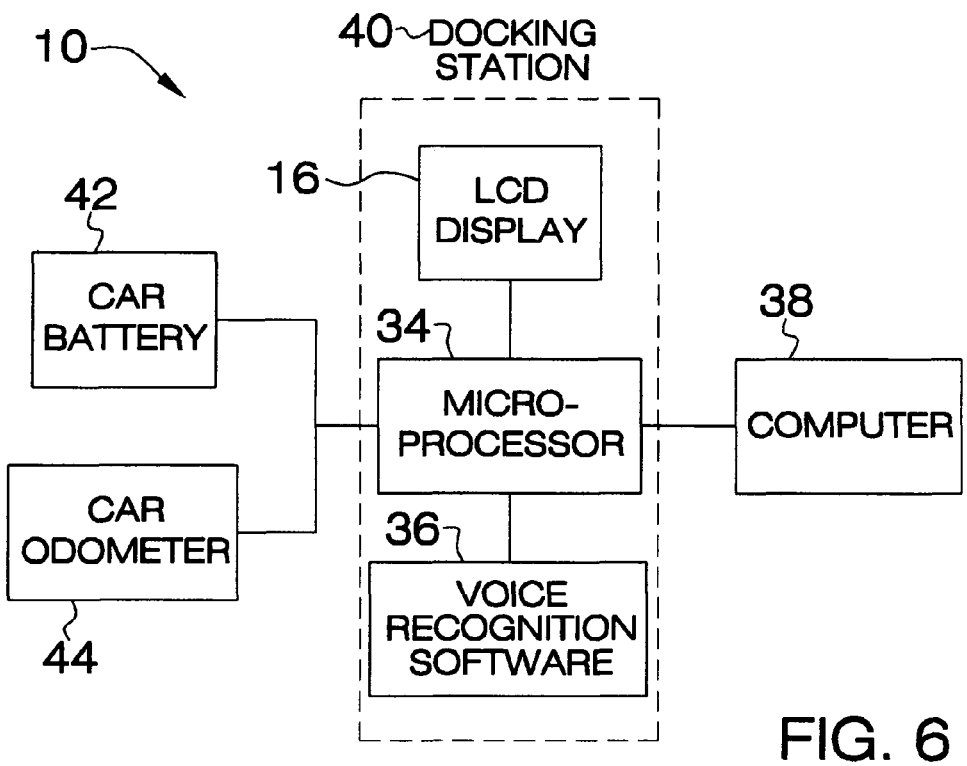
FIG. 6 is a schematic view of an alternative embodiment of the mileage tracking device of the present invention.

Concluding with FIG. 6, an alternative embodiment of the new and improved mileage tracking device 10 of the present invention for tracking a vehicle's mileage is illustrated and will be described. More particularly, the alternative embodiment of the mileage tracking device 10 has a docking station 40 that connects mileage tracking device 10 directly to car battery 42 and car odometer 44. In this embodiment, the user does not have to enter data from car odometer 44. Instead, the user simply needs to command microprocessor 34 to obtain data from car odometer 44, such as the reading at the beginning or end of a trip. As in the first embodiment, a computer 38 can be connected to data port 26 to upload information from and download information to memory 36. Note that computer 38 is for illustrative purposes only and is not part of the current invention.

In use, it can now be understood that the user selects an embodiment of the mileage tracking device 10. If the docking station 40 is selected, the user does not have to enter readings from car odometer 44. Instead, the user merely needs to instruct microprocessor 34 to obtain the current reading from the car odometer 44 as needed. Otherwise, when a function is selected by touching display 16 or by speaking a command recognized by voice recognition software stored in memory 36 that requires a car odometer 44 reading, the user enters it using keypad 18 or by speaking. Likewise, data associated with any of the functions can be entered and retrieved using any desired combination of display 16, keypad 18, and the voice recognition software stored in memory 36.

While a current embodiment of the mileage tracking device has been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention. For example, any desired data may be stored instead of or in addition to the names, phone numbers, addresses, and e-mail addresses described. In addition, the car charger may be replaced by another cord with a transformer to connect the power port to a wall electrical outlet. Also, data associated with other types of vehicle servicing other than oil changes and tire rotations may be tracked and stored. Furthermore, a wide variety of data port types, such as a FireWire or Ethernet port, may be used instead of the USB port described.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mileage tracking device comprising:
   a top having opposing ends, a front, and a rear;
   a bottom having opposing ends, opposing sides, a front, and a rear with one of said opposing ends hingedly attached to one of said opposing ends of said top;
   a display attached to said front of said top;
   a keypad attached to said front of said bottom;
   a microprocessor connected to said keypad and said display;
   memory connected to said microprocessor, wherein said memory and said microprocessor perform calculator, calendar, address book, mileage log, and car maintenance tracking functions; and
   wherein said mileage log function comprises entering and retrieving starting date and time, ending date and time, a vehicle's starting odometer reading, a vehicle's ending odometer reading, total miles traveled, and purpose/destination data using the keypad.

2. The mileage tracking device as defined in claim 1, wherein said display is an LCD touchscreen.

3. The mileage tracking device as defined in claim 1, further comprising a data port attached to one of said opposing sides of said bottom.

4. The mileage tracking device as defined in claim 3, wherein said data port is selected from the group consisting of Ethernet ports, USB ports, and FireWire ports.

5. The mileage tracking device as defined in claim 1, further comprising:
a battery compartment attached to said rear of said bottom; and
a battery removably enclosed by said battery compartment.

6. The mileage tracking device as defined in claim 5, wherein said battery is rechargeable.

7. The mileage tracking device as defined in claim 5, wherein said display displays the current date and time and the current charge of said battery.

8. The mileage tracking device as defined in claim 1, further comprising a solar panel attached to said rear of said top.

9. The mileage tracking device as defined in claim 1, further comprising a power port attached to one of said opposing sides of said rear.

10. The mileage tracking device as defined in claim 1, wherein said calculator function comprises addition, subtraction, multiplication, and division.

11. The mileage tracking device as defined in claim 1, wherein said calendar function comprises entering and retrieving one or more appointments with date, time, and location data.

12. The mileage tracking device as defined in claim 1, wherein said address book function comprises entering and retrieving name, address, telephone number, and e-mail address data.

13. The mileage tracking device as defined in claim 1, wherein said car maintenance function comprises entering and retrieving next oil change date, next tire rotation date, mileage interval between oil changes, and mileage interval between tire rotations data.

14. The mileage tracking device as defined in claim 1, further comprising voice recognition software stored in said memory, wherein said mileage log function further comprises entering and retrieving starting date and time, ending date and time, a vehicle's starting odometer reading, a vehicle's ending odometer reading, total miles traveled, and purpose/destination data by speaking.

15. A mileage tracking device comprising:
a top having opposing ends, a front, and a rear;
a bottom having opposing ends, opposing sides, a front, and a rear with one of said opposing ends hingedly attached to one of said opposing ends of said top;
a display attached to said front of said top;
a keypad attached to said front of said bottom;
a microprocessor connected to said keypad and said display;
memory connected to said microprocessor, wherein said memory and said microprocessor perform calculator, calendar, address book, mileage log, and car maintenance tracking functions;
wherein said mileage log function comprises entering and retrieving starting date and time, ending date and time, a vehicles's starting odometer reading, a vehicle's ending odometer reading, total miles traveled, and purpose/destination data using the keypad; and
a docking station, wherein said docking station connects said microprocessor to a vehicle battery and a vehicle odometer of a vehicle.

16. The mileage tracking device as defined in claim 15, further comprising:
a data port attached to one of said opposing sides of said bottom;
a battery compartment attached to said rear of said bottom;
a battery removably enclosed by said battery compartment;
a solar panel attached to said rear of said top;
a power port attached to one of said opposing sides of said rear; and
a car charger having opposing ends, wherein one of said opposing ends is adapted to fit said power port and one of said opposing ends is adapted to fit a DC power outlet of a vehicle.

17. The mileage tracking device as defined in claim 15, wherein said car maintenance function comprises entering and retrieving next oil change date, next tire rotation date, mileage interval between oil changes, and mileage interval between tire rotations data.

18. A mileage tracking device comprising:
a top having opposing ends, a front, and a rear;
a bottom having opposing ends, opposing sides, a front, and a rear with one of said opposing ends hingedly attached to one of said opposing ends of said top;
a display attached to said front of said top;
a keypad attached to said front of said rear;
a microprocessor connected to said keypad and said display;
memory connected to said microprocessor, wherein said memory and said microprocessor perform calculator, calendar, address book, mileage log, and car maintenance tracking functions;
wherein said mileage log function comprises entering and retrieving starting date and time, ending date and time, a vehicle's starting odometer reading, a vehicle's ending odometer reading, total miles traveled, and purpose/destination data using the keypad;
voice recognition software stored in said memory, wherein said mileage log function further comprises entering, and retrieving starting date and time, ending date and time, a vehicle's starting odometer reading, a vehicles ending odometer reading, total miles traveled, and purpose/destination data by speaking;
a data port attached to one of said opposing sides of said bottom;
a battery compartment attached to said rear of said bottom;
a battery removably enclosed by said battery compartment;
a solar panel attached to said rear of said top;
a power port attached to one of said opposing sides of said rear; and
a car charger having opposing ends, wherein one of said opposing ends is adapted to fit said power port and one of said opposing ends is adapted to fit a DC power outlet of a vehicle.

* * * * *